Jan. 19, 1965 S. GREENWALD 3,166,743

QUANTIZER WITH BINARY OUTPUT

Filed Sept. 18, 1961

INVENTOR.
Sidney Greenwald
BY Joseph A. Genovese &
Max L. Libman
Attorneys

United States Patent Office 3,166,743
Patented Jan. 19, 1965

3,166,743
QUANTIZER WITH BINARY OUTPUT
Sidney Greenwald, Hyattsville, Md., assignor, by mesne assignments, to Control Data Corporation, Minneapolis, Minn., a corporation of Minnesota
Filed Sept. 18, 1961, Ser. No. 138,868
13 Claims. (Cl. 340—347)

This invention relates to quantizer circuits and particularly to a circuit which provides coded outputs representing different levels of input signals within a predetermined parameter.

It is often desirable to quantize signals, for example, in data proceeding equipment, so that the signals are more readily handled throughout the system. The concept of quantizing signals is quite well known; in fact, wherever there is a circuit component or sub-assembly having a threshold to trigger the same, this is, in a sense, quantizing. More direct references to quantizing circuits are made in numerous prior patents, particularly those pertaining to the reading machine art.

There appears to be little or no difficulty in quantizing signals to make digital outputs available for computer-like equipment. Ordinarily, the incoming signals are quantized to two levels represented by a binary "1" or a binary "0." Patent No. 3,104,372 discloses a multi-level quantizing system as it applies to reading machines, where the output (quantized) signals are represented in binary code and correspond to more than two levels of input signals. The advantages of multi-level quantizing are discussed in the above patent. Briefly, summarizing one of the principal advantages, quantizing to only two levels disregards certain information which is inherent in the input signals. For instance, in a reading machine application, the input signals may correspond to the optical density of the scanned character. If the signals are quantized only to two levels, i.e. corresponding to "black" or "white" respectively, the quantizer must make a decision for all of the intermediate shades of grey, calling them either "black" or "white." There are two disadvantages in doing this. One is that poor print often includes characters which vary in optical density. Some pieces of the character may be much lighter than others and these pieces would be called either "white" (which would be erroneous) or "black." Another disadvantage is that all typing is not uniform in optical density. Some pages of typewritten or printed material is very black, while others vary between light grey, dark grey and black. Thus, the quantizing level at which the machine operates has a great bearing on the amount and/or accuracy of information that is obtained from the printed document. Of course, what is said of "print" also applies to handwritten material which I consider as a form of "print."

An object of my invention is to provide a quantizing circuit capable of providing binary output signals on only two conductors, which correspond to more than two levels of input signals.

A very important feature of my invention is found in the circuit construction and operation of the quantizer. This feature is discussed in detail in the specification, but briefly, this feature requires the quantizer circuit to function with a high degree of certainty. In other words, the circuit construction is such that there can be no ambiguities in the binary output code, regardless of how near are the input signals to the quantized level separations.

A further object of the invention is to provide a quantizer circuit whose input signals may vary within predetermined maximum and minimum limits and which provides output codes on only two lines, even though the quantizing levels for the input signals are more than two, for example, at four levels representing "white," "light grey," "dark grey" and "black" respectively when the quantizer circuit is used in association with a reading machine or like equipment.

Although the preceding discussion and the succeeding description deals principally with reading machines of the optical type, it is understood that my circuit is capable of quantizing input signals regardless of the initiating source, i.e. whether or not they ultimately derive from a reading machine scanner or the equivalent. Therefore, I may summarize this by indicating that my quantizer circuit is not only of general application, i.e. disregarding the type of initiating signal source, but also another phase of my invention is to solve a problem which is considered critical in reading machines, by having my quantizer process character-data by establishing binary codes, or the equivalent, representing different gradations of optical density of the characters as they are printed or otherwise formed on the document.

I use the term "character" to include numbers, letters, symbols, patterns, or any portion of any pattern capable of being processed by machine for identification or other purposes.

Other objects and features of importance will become apparent in following the description of the illustrated form of the invention.

Figure 1:
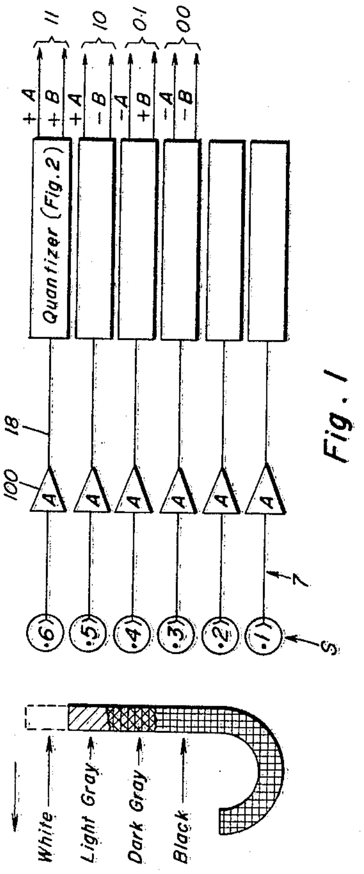
FIGURE 1 is a diagrammatic view showing a character printed in such a way that various parts thereof are of different optical density, and also showing a scanner with its amplifiers and the relationship of several quantizer circuits therewith.

FIGURE 1 shows a character image projected by an optical projection system (not shown) on the face of a scanner S made of a vertical row of photocells numbered 1–6 inclusive. The character is poorly printed having portions which are light grey, dark grey, and black respectively and also a portion which is so much lighter than light grey as to be called "white." The scanner S is a conventional scanner, and the control circuitry usually associated with such a scanner is not shown herein since it forms no part of my present invention. This being the case, it is understood that any type of conventional scanner could be used, and my quantizer circuitry would still be perfectly compatible therewith. Since a multi-photocell scanner S is shown, I have illustrated a group of output conductors 7 connected to the input terminals (not shown) of amplifiers 100, and the output lines 18 from the amplifiers operatively connected with the quantizers of FIGURE 1. As is completely understood in the art, when a photocell is exposed to "white" its amplifier may be made to provide an output signal which is either higher (positive) or lower (negative) than any reference. To simplify the disclosure, assume that the reference is zero volts and when one of the photocells of the scanner sees "white" the output from the amplifier on line 18 (FIGURE 1) will be minus nine volts. Since perfect "white" does not ordinarily exist (one hundred percent light reflection) we can arbitrarily assume that any voltage on one of the lines 18 which is in the range of −9 volts to −7 volts will be as a result of the photocell seeing "white." Similarly, (see chart in FIGURE 3) when the photocell sees light grey, the output signal from the amplifier associated with the photocell will be in the range of −7 volts to −5 volts. For dark grey the output signal will be from −5 to −3 volts. Absolute black does not ordinarily exit (100% light absorption) and therefore we can assume that an output signal on one of the lines 18 which is in the range of −3 volts to −1 volt will be as the result of "black."

Figure 3:
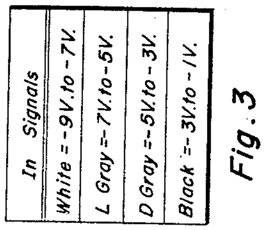
FIGURE 3 is a chart showing an arbitrarily selected parameter of signal values which correspond to the optical density of print to be identified by machine.
Figure 4:
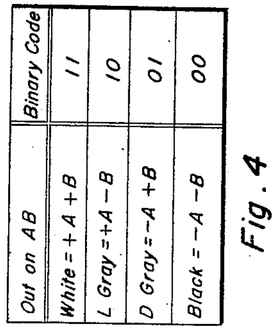
FIGURE 4 is another chart with the letters A and B corresponding to output wires of FIGURE 2 and showing the sense of the signals conducted thereby to generate a binary code ultimately representing the "white," "light grey," etc., as listed in the chart of FIGURE 3.
Figure 2:
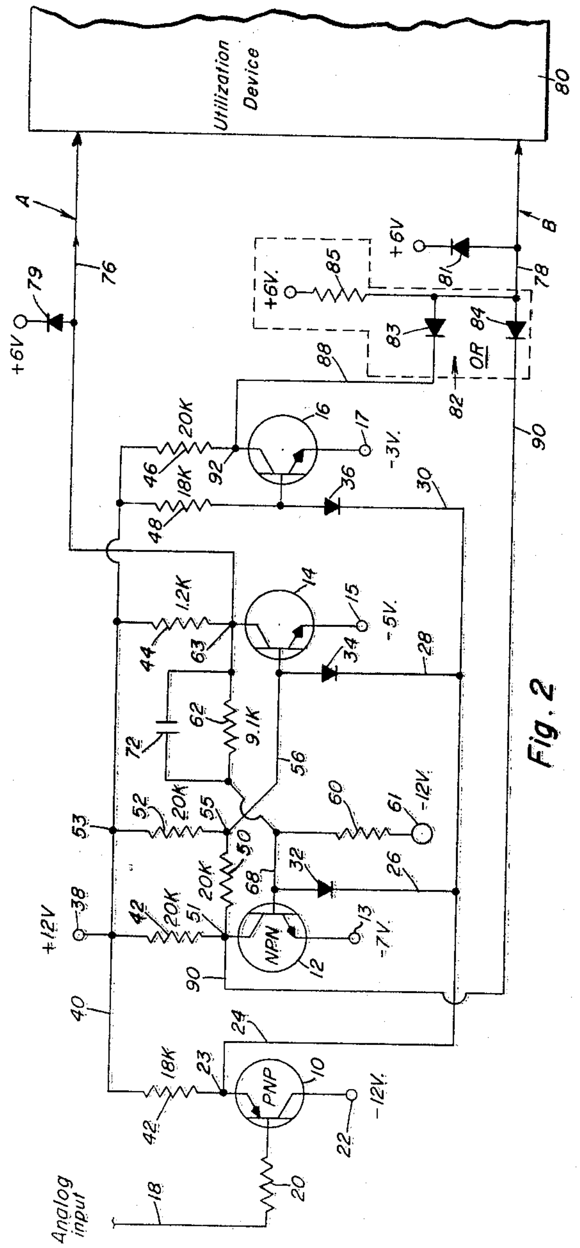
FIGURE 2 is a wiring diagram showing one of the quantizers of FIGURE 1 in detail.

The purpose of the quantizer circuit shown in detail in FIGURE 2 and shown diagrammatically in FIGURE 1, is best seen by comparing the charts of FIGURES 3 and 4. I have already discussed the charts of FIGURE 3, and the chart of FIGURE 4 shows what combinations of signals on lines A and B correspond to the binary code (FIGURE 4) that represents the previously discussed white, light grey, dark grey and black seen by the scanner S when a character image is being investigated by the scanner. Lines A and B (FIGURE 2) are connected with a utilization device 80 which is described later as one of a plurality of possible devices. For reading machine applications device 80 is preferably a "digitizer" which responds to the sense of the signals on lines A and B and not the magnitudes thereof. Of course, the "sense" need not be plus or minus about 0 as a reference as is in the ordinary case, but may be signals over and above any arbitrarily selected reference.

Attention is now directed to FIGURE 2 showing a preferred configuration of one of the quantizers in FIGURE 1. I shall first discuss mainly the actual construction of the circuit and then describe the operation thereof in steps, i.e. the four different operational phases of the circuit which take place when the input signals are within the various sub-levels shown in the chart in FIGURE 3. There are some resistor values given on the drawing but not mentioned in the text. These values have been calculated as appropriate for a quantizer operating in the voltage ranges discussed later as typical examples making up a full parameter.

*Construction*

The construction of the quantizer circuit is as follows: There are four transistors 10, 12, 14 and 16 respectively with the transistor 10 being a PNP emitter follower whose base receives the incoming signals on line 18 through a current limiting resistor 20. The collector of transistor 10 is connected with a source 22 of bias potential, for instance minus 12 volts. The emitter has a conductor 24 connected with it, and the conductor is connected by way of lines 26, 28 and 30 to the bases of NPN transistors 12, 14 and 16 through unidirectional devices, for instance diodes 32, 34 and 36. Consequently, the input signal at the connection point 23 with the emitter of emitter follower 10 is applied in parallel to the bases of the three control transistors 12, 14 and 16 which serve a switching function (described later).

The emitters of transistors 12, 14 and 16 are connected with sources of bias potential which correspond to the voltage levels at which the circuit is to quantize incoming signals. The source 13 for transistor 12 may be minus 7 volts, the source 15 for transistor 14 may be minus 5 volts and the source 17 for transistor 16 may be minus 3 volts as an example of a workable parameter whose maximum is minus 9 volts (at point 23) and whose minimum is below minus 3 volts (at point 92 which is described subsequently).

As is customary for an emitter follower, there is a source 38 of positive potential (because source 22 is negative) applied by way of conductor 40 and resistor 42 to the emitter of the emitter follower 10. This plus 12 volt source 38 is also connected with the collector of transistor 12 through resistor 42. The plus 12 volt source 38 is also applied to the collector of transistor 14 by way of resistor 44 and to the collector of transistor 16 by way of resistor 46. In addition, there is a resistive connection 48 from source 38 to the base of transistor 16. A resistor divider network composed of resistors 50 and 52, is connected respectively at point 51 with the 12 volt source 38 through resistor 42 and at point 53 with the 12 volt source 38. Point 55 of the network has conductor 56 connected wherewith (center-tap between resistors 50 and 52) to conduct voltage from the collector of transistor 12 to the base of transistor 14. Another voltage divider network consisting of resistor 60 connected to minus 12 volts at 61, and resistor 62 connected with point 63 (the collector, i.e. output of transistor 14) is connected with the base of transistor 12 by way of line 68. Capacitor 72 across resistors 62 accelerates the signal across resistor 62.

There are two output lines 76 and 78 also labeled A and B, respectively, one being the high level output line and the other being the low level output line of the circuit. There are clamping diodes 79 and 81 connected to a plus 6 volt source and to the lines A and B respectively. The clamping diodes prevent the signals on lines A and B from exceeding plus 6 volts which is the desired maximum voltage (arbitrarily selected) to provide the ultimate binary code output to utilization device 80.

Line 76 is connected to point 63 (the output of transistor 14) for reasons to be described later, while line 78 is the output of a negative OR gate 82. The OR gate 82 is made of diodes 83 and 84 and resistor 85 which is connected to a plus 6 volt source and to the diodes. The construction and operation of the OR gate is conventional, the gate having input lines 88 and 90 with line 88 connected to the output transistor 16 at point 92. Line 90 is connected to point 51 which is the output of transistor 12, with the result that signals at points 51 or 92 are passed by gate 82 to ultimately provide the binary code (low level) signal on line 78 (B). Summarizing the circuit construction to this point we have a single input line 18 for receiving signals within a given parameter, say from minus 9 volts to minus 1 volt, and two output lines A and B which provide positive and negative code signals (FIGURE 2). In each case I distinguish between a positive signal and a negative signal with respect to ground, and obviously both signals could be negative as in the case of "black" or both signals could be positive as in the case of "white" (shown on the chart in FIGURE 4).

*Operation*

The function and operation of the circuit for each of the gradations listed in the charts FIGURES 3 and 4 are as follows. For "white" the binary code output is "1 1" meaning that lines A and B will each conduct positive signals with respect to ground. When scanner photocell 6 sees "white" (FIGURE 1), the amplifier 100 will provide an output on line 18 which is between minus 9 and minus 7 volts. Thus, point 23 (FIG. 2) of the emitter follower 10 sees a voltage within this range—say nine volts as an example. The nine volt signal is applied to the bases of the transistors 12, 14 and 16 through diodes 32, 34 and 36 thereby cutting off these three transistors. The transistors are cut off because the input signal of minus 9 volts on line 24 is more negative than the emitter source potential-connection at 13, 15 and 17 of each control transistor 12, 14 and 16. This means that points 51, 63 and 92 will rise as high as possible, i.e. from plus 12 volt source 38 through the respective resistors 42, 44 and 46. Accordingly, line 90 which is connected to point 51 of transistor 12, will conduct a positive signal (from source 38) to the OR gate diode 84 and provide an output signal on line B which is clamped to plus 6 volts by diode 80. OR gate 82 is a negative OR gate, meaning that if either of its entries on lines 90 or 88 is negative, the output signal on line 78 will be negative. But in the example that we are now considering line 90 is positive and so is line 88 because the plus twelve volts source at 38 is conducted on line 40 through resistor 46 to point 92, i.e. the collector of transistor 16 which at this time is cut off, as described before. Thus, both inputs to OR gate 82 are positive, giving us the desired positive signal on line B. Now, for line A, transistor 14 being cut off, will prevent conduction from the minus five volts source 15, and point 63 will have a positive signal (via line 40, resistor 44), which is conducted on line 76. Thus, the condition "1 1" is satisfied.

Now, a more complicated case is where the input signal on line 18 is in the range of minus 7 to minus 5 volts, for instance minus 6 volts. Point 23 of the emitter follower will see a minus 6 volt signal which is conducted on lines 24 and 26 to the base of transistor 12. Since the minus 6 volt signal is less negative than source 13, transistor 12 is turned on. However, note that transistors 14 and 16 are still turned off because the signal on line 24 is less than the sources 15 and 17 (consider the word "less" to mean farther away from the zero reference).

When transistor 12 conducts, point 51 which is the output of transistor 12, goes to minus 7 from source 13 thereby bringing the OR gate 82 line 90 down to minus 7 volts. Being a negative OR gate, with one input negative, the output on line 78 (B) must be negative. Lines 76 and 88 will remain positive in the same manner as described before. Thus we have the condition of "light grey" yielding a binary code output of "1 0" on lines A and B respectively.

Now let us assume that the input signal on line 18 is the result of scanning dark grey, i.e. the signal will be between minus 5 volts and minus 3 volts, for instance minus 4 volts. Thus, the emitter output point 23 will see minus 4 volts thereby allowing transistors 12 and 14 to conduct because the input signal are less than source signals (minus 7 and minus 5 at 13 and 15 respectively).

The process of transistors 14 and 12 going into conduction is an important feature of this invention. In this instance transistor 14 is allowed to turn on, and as a result, conduction through resistor 44 makes point 63 begin to go negative. This negative signal is transmitted through a feedback loop at resistors 62 and 60 and line 68 to the base of transistor 12. This signal, being negative, has a tendency to turn transistor 12 off, and thus point 51 starts to rise in a positive direction. Through the resistor network including resistors 50 and 52, this rising potential is applied to transistor 14 to turn it on more strongly, and hence the signal at point 63 goes even more negative which then is further applied to transistor 12 by way of network 62 and 60 and line 68. The net result is a regenerative process in which transistor 14 is fully turned on and transistor 12 is fully turned off. As a further result point 63 goes negative and this negative voltage is transmitted by line 76 (A) to the utilization device. Simultaneously, point 51 goes positive and this positive voltage is transmitted over line 90 to the negative OR gate diode 84. Thus, line B is positive giving us, as a final result, line A negative ("0") and line B positive ("1"). The input to OR gate 82 on line 88 will, of course, be positive as before since transistor 16 remains in an off or non-conducting condition.

This feature of the feedback loop, is important because there is never a condition at which the circuit is undecided as to its output. The mutual assistance of the signals of transistors 14 and 12 is made possible by the feedback loop. Summarizing this in a general way, it is possible for both transistors 12 and 14 to be "off," but never possible for both of them to be "on" simultaneously. Either one or the other conducts, but not both. The feedback feature is used in developing a signal or lines A, B representing "dark grey" as described above and also for "black" as described below.

Now, for the final situation where the input signal on line 18 represents "black." Assume that the emitter follower point 23 is minus 2 volts. The pair of transistors 12 and 14 will go to the same state as described above, namely the signal on line 76 is negative and the signal on line 90 is positive. It is understood that the feedback loop operation is identical to that described above in connection with the 4 volt (dark grey) input signal. The additional feature for the "black" signal is that diode 36 disconnects because the signal on line 30 is minus 2 volts and the source potential at 17 to the emitter of transistor 16 is minus 3 volts. Thus, transistor 16 goes into conduction so that point 92 goes negative whereby there is a negative signal on line 88. Although the signal on line 90 is positive, the OR gate 82, being a negative OR gate, provides an output on line 78 which is negative and equal to the signal on line 88. Consequently, we have a situation where the signals on lines 76 and 78 are negative, yielding a "00" binary code.

Summarizing, my quantizer circuit has only two output wires A and B and an input line 18 which receives signals of any value within a predetermined maximum and minimum to define a parameter of input signals. The output lines A and B provide codes representing four different gradations of signal levels within the parameter of inputs.

The utilization device 80 can be considerably varied. One practical application is to have the utilization device 80 a "digitizer" which responds to negative and positive input signals at any voltage level. Assume that a reference of zero voltage is the cut off point. All signals above zero on either line 76 or 78 will provide an output from the utilization device of a positive sense. All signals below zero will provide an output on a line of the utilization device (not shown) which is negative. The output signals from the utilization device may be made equal in all instances, for instance always plus 6 and always minus 6 volts respectively regardless of the value of the input signal and only dependent on the sense of the input signals.

It is understood that various changes and modifications may be made without departing from the protection of the claims. Further, the various terms used herein are defined in accordance with present usage in the art. For example, control transistors 12, 14 and 16 are said to be "cut off" or "turned off," meaning that they do not conduct. They are also said to be "turned on," meaning that they conduct, just as in tube circuits. For convenience, certain of the signals are said to be of different polarities. I use this term to mean that the signals are on opposite sides of a reference which need not be zero volts. For example, with 8 volts as a reference, a five volt signal will have an "opposite polarity" from that of a ten volt signal.

I claim:

1. A quantizer circuit comprising input means to receive signals within a given parameter, said circuit having two output conductors adapted to conduct code signals by providing different combinations of signals of different senses in accordance with the values of the input signals on said input means, said circuit further including a first control transistor, a second control transistor and a third control transistor, means to bias all of said control transistors to cut off by individual source signals that vary in value in accordance with different quantizing levels, means including an OR gate connecting said first transistor with one of said output lines, means connecting said second transistor with the other of said output lines, means to connect the output of the third transistor with said OR gate so that said OR gate passes the output of said third transistor or the output of the said first transistor, further source potential means of a polarity opposite to the first mentioned source potentials and applied to said first and second and third transistors, said first and second and third transistors being selectively cut off or brought into conduction in accordance with the value of said input signal with respect to the values of said individual source signals, a feedback loop connected between said first and second transistors at the input of said first transistor and the output of said second transistor respectively, to assist said first transistor to become cut off when said second transistor goes into conduction due to the particular value of the input signal on said input means whereby this utilization of feedback from the second transistor to the first transistor assures that the outputs on said output lines are certain.

2. In a quantizer having input means for a range of analog signals, a first and a second control transistor each having a base and a collector and an emitter, means providing a potential to each collector, source signal conducting means connected to each emitter, said source signals being at different signal levels for the respective transistors to correspond to the different levels at which incoming signals are quantized, means for applying an analog incoming signal to the bases of said transistors so that the incoming signal tends to drive said transistors to cut-off, said first transistor conducting when said incoming signal is smaller than the bias source thereof and larger than the bias source of said second transistor and providing an output at its collector, an output line connected with the last-mentioned collector, and another output line connected with the collector of said second transistor which is cut off by its source signal so that the signal on said second output line corresponds to the signal provided by the first-mentioned potential providing means.

3. In a quantizer circuit providing coded outputs on a pair of jointly functioning output conductors for a parameter of D.C. input signals, input means for said signals, a first and a second and a third control transistor, said transistors each having a base and a collector and an emitter, negative source signals corresponding to quantize levels connected to the emitters of the respective transistors, positive signal conducting means applied to the collectors of said transistors, said input means connected to the bases of all of said transistors through unidirectional devices, the collectors of said transistors providing output terminals, means OR gating the output terminals of said first and third transistors to one of said output conductors, the other output conductor connected with the output terminal of said second transistor, and when the input signal on said input means is smaller than the said source signal on the emitters of said first and said second transistors said second transistor is allowed to go into conduction making its output negative, a feedback loop transmitting said negative signal to the base of said first transistor and having a tendency to cut off said first control transistor so that the output terminal of said first transistor starts to rise positively, a network connected to the last-mentioned terminal and to the base of said second transistor to conduct the rising positive signal thereto and more forcefully turn on said second transistor so that said output terminal of the second transistor goes even more negative which is further applied to said first transistor as aforesaid whereby the result is a regenerative process in which said second transistor is fully turned on and said first transistor is fully turned off, and said code being developed on said conductors by the polarity of signals conducted thereon.

4. The quantizer circuit of claim 3 wherein the input signals are derived from scanning a pattern by means of the scanner of a reading machine.

5. The quantizer circuit of claim 3 wherein there are two of said output conductors to conduct signals of different polarity combinations relative to a given reference and thereby develop code which corresponds to at least four levels of input signals.

6. A circuit to quantize analog signals and provide output codes on a pair of code output lines where the codes correspond to four levels of input signals, said circuit comprising an analog input signal conductor, a first and a second and a third transistor all connected in parallel to said input signal conductor so that each of the three transistors experiences all possible levels of the analog input signals, means providing a first potential to one terminal of each transistor, source signal conducting means connected to another terminal of each transistor, said source signal conducting means providing a different source signal level to bias the respective transistors in a manner that each separate source signal represents a signal value division at which the incoming signals are to be quantized, said incoming signals tending to drive each transistor to cut-off, an OR gate, conductors connected to the output terminals of said first and third transistors and connected to said OR gate, one of said pair of code output lines being the output line of said OR gate, and the other code line connected to the output terminal of said second transistor.

7. A circuit to quantize analog signals and provide output codes on a pair of code output lines where the codes correspond to four levels of input signals, said circuit comprising an analog input signal conductor, a first and a second and a third transistor all connected in parallel to said input signal conductor so that each of the three transistors experiences all possible levels of input signals, means providing a first potential to one terminal of each transistor, source signal conducting means connected to another terminal of each transistor, said source signal conducting means providing a different source signal level to bias the respective transistors in a manner that each separate source signal represents a signal value division at which the incoming signals are to be quantized, said incoming signals tending to drive each transistor to cut-off, an OR gate, conductors connected to the output terminals of said first and third transistors and connected to said OR gate, one of said pair of code output lines being the output line of said OR gate, and the other code line connected to the output terminal of said second transistor, a first code of said four possible codes on said code lines being established when the input signal is of a value sufficient to cut off all of said transistors whereby the code signals on said pair of lines are derived from said first potential providing means.

8. The subject matter of claim 7 wherein a second code on said code line is established when the input signal is of a value sufficient to cut off said second and third transistor but not the first transistor so that said first transistor conducts its source potential to said OR gate and the code line associated therewith, while the other of said pair of code lines conducts a signal derived from said first potential due to said second transistor being cut off.

9. The subject matter of claim 8 wherein a third code on said code lines is established when the input signal is of a value sufficient to cut off only said third transistor thereby allowing said first and second transistors to conduct their respective source potentials, a regenerative feedback means connected between said second and first transistor by which said second transistor is driven more strongly into conduction and said first transistor is cut off and more strongly cut off as said second transistor is more strongly conductive so that the output signal from said second transistor is conducted on one of said code lines and the output of said now cut off transistor passes the regenerative feedback signal to said OR gate for the other of said code lines.

10. The subject matter of claim 9 wherein said feedback means include a voltage divider with resistive legs, and a capactive accelerator across one of said resistive legs.

11. The subject matter of claim 9 wherein a fourth code on said code lines is established when the input signal is of a value that none of said transistors are cut off whereby a code signal is present on one of said code lines owing to said regenerative feedback means associated with said first and second transistors, a diode through which said last-mentioned input signal passes to reach said third transistor, the source potential of said third transistor being of a value with respect to the last-mentioned input signal that said diode disconnects allowing the third transistor to conduct in a manner that its output is derived from its source potential and occurs on one of the input lines of said OR gate to establish the code signal on the other of said pair of code signal lines.

12. The subject matter of claim 11 wherein the codes are established by the polarity of the signals concurrently conducted on said pairs of code lines for each quantize level.

13. The subject matter of claim 12 wherein the code convention for said code lines is established by the selection of transistor types where for example said transistors are of the NPN type said source potentials are negative, said incoming signals are negative, said means providing the first potential to the three transistors provides a positive potential, said regenerative feedback means provides negative feedback signals, and said OR gate is a negative gate which provides a negative signal when either or both of its input signals is negative.

References Cited by the Examiner

UNITED STATES PATENTS

| | | | |
|---|---|---|---|
| 2,870,348 | 1/59 | Chao | 307—88.5 |
| 2,985,298 | 5/61 | Schreiner | 340—146.3 |
| 3,023,406 | 2/62 | Jones | 340—347 |

MALCOLM A. MORRISON, *Primary Examiner.*